(12) United States Patent
Ishikawa

(10) Patent No.: US 6,676,158 B2
(45) Date of Patent: Jan. 13, 2004

(54) AIRBAG AND FOLDING METHOD THEREOF

(75) Inventor: Katsumi Ishikawa, Shizuoka (JP)

(73) Assignee: Nihon Plast Co., Ltd., Fuji (JP)

( * ) Notice: Subject to any disclaimer, the term of this patent is extended or adjusted under 35 U.S.C. 154(b) by 0 days.

(21) Appl. No.: 09/987,431

(22) Filed: Nov. 14, 2001

(65) Prior Publication Data

US 2002/0067032 A1 Jun. 6, 2002

(30) Foreign Application Priority Data

Nov. 14, 2000 (JP) ........................................ 2000-347216

(51) Int. Cl.[7] ............................................... B60R 21/16
(52) U.S. Cl. ..................................................... 280/743.1
(58) Field of Search ......................... 280/743.1, 743.2, 280/740, 742, 729, 731

(56) References Cited

U.S. PATENT DOCUMENTS

| | | | | |
|---|---|---|---|---|
| 5,033,771 A | * | 7/1991 | Miyauchi et al. | 280/728.1 |
| 5,186,489 A | * | 2/1993 | Imai | 280/728.2 |
| 5,573,270 A | | 11/1996 | Sogi et al. | 280/740 |
| 5,678,858 A | * | 10/1997 | Nakayama et al. | 280/743.2 |
| 5,848,805 A | * | 12/1998 | Sogi et al. | 280/743.2 |
| 6,022,046 A | * | 2/2000 | Isomura et al. | 280/743.2 |
| 6,059,312 A | * | 5/2000 | Staub et al. | 280/729 |
| 6,086,092 A | * | 7/2000 | Hill | 280/729 |
| 6,209,911 B1 | * | 4/2001 | Igawa et al. | 280/740 |
| 6,224,101 B1 | * | 5/2001 | Nishijima et al. | 280/743.2 |
| 6,345,841 B2 | * | 2/2002 | Igawa et al. | 280/740 |
| 6,471,239 B1 | * | 10/2002 | Nishijima et al. | 280/729 |
| 6,471,244 B1 | * | 10/2002 | Nishijima et al. | 280/742 |

FOREIGN PATENT DOCUMENTS

| | | |
|---|---|---|
| EP | 1 088 708 A2 | 4/2001 |
| JP | 7-149199 | 6/1995 |
| JP | 10-152009 | 6/1998 |
| JP | 2001-097159 | 4/2001 |

\* cited by examiner

*Primary Examiner*—Paul N. Dickson
*Assistant Examiner*—Faye M. Fleming
(74) *Attorney, Agent, or Firm*—Foley & Lardner

(57) ABSTRACT

An airbag includes a first cloth with a gas introduction port; a second cloth superimposed on the first cloth, wherein the first and second cloths cooperate to define an airbag compartment; a third cloth interposed between the first and second cloths to cover the gas introduction port; a plurality of junctions for joining the first and third cloths together; an exhaust hole arranged in one of the junctions for communication with the outside of the airbag; and a band having one end connected to the third cloth and another end connected to the second cloth.

27 Claims, 8 Drawing Sheets

AIRBAG AND FOLDING METHOD THEREOF

BACKGROUND OF THE INVENTION

The present invention relates to an airbag mounted, for example, to a steering wheel for a motor vehicle and a folding method thereof.

Airbag arrangements, which are mounted, for example, to bosses of steering wheels for motor vehicles, include an airbag that is inflated by inflow gas in the event of vehicle collision for alleviating an impact to be applied to an occupant or driver. The airbag includes two circular nylon woven cloths, the outer peripheries of which are sewn together to have a shape like a flat bag. The vehicle body-side cloth has a gas introduction port, the periphery of which is fixed to a steering-wheel main body, and from which gas is introduced into the airbag. Normally, the airbag is received, in tiny fold, in the steering-wheel main body, and when an inflator is actuated, it is inflated toward the occupant by gas injected from the inflator so as to hold and restrain the occupant thrown forward, alleviating a collision impact to be applied thereto.

Considering the case where the airbag arrangement is actuated when the occupant is seated in an extremely forward inclined posture to have upper body adjacent to the steering wheel, for example, i.e. out of position, the airbag is demanded to deploy flatly widely to alleviate the pressure applied to the occupant. In response to such demand, JP-A 7-149199 proposes an airbag including a cloth arranged therein for controlling gas flow toward the outer periphery. Specifically, a circular inside cloth is arranged in an outer shell comprising an inflator-side cloth and an occupant-side cloth to conceal a gas introduction port. The outer periphery of the inside cloth is partly sewn to the inflator-side cloth, between which gas is introduced into the airbag.

In the airbag disclosed in JP-A 7-149199, the presence of the inside cloth imposes a positional limitation of a vent hole or exhaust hole. Thus, the vent hole is disposed at the outer periphery of the inside cloth. However, due to an influence of gas exhausted from the vent hole exerted on the occupant, such arrangement of the vent hole may require means for cooling gas supplied from the inflator or an inflator generating relatively low-temperature gas, resulting in difficult reduction in manufacturing cost. Moreover, with outer-periphery arrangement of the vent hole, the vent hole needs to surely face the inflator or the counter-occupant side at deployment of the airbag so as to secure occupant cushioning and pressure regulation, requiring a rather troublesome airbag folding method, resulting in unfavorable deployment characteristics. Further, the inside cloth of smaller than a predetermined length cannot provide operation of changing gas flow, while the inside cloth of larger than a predetermined length will have a center portion greatly expanding to the occupant at gas inflow, raising a problem of the pressure provided to the occupant.

SUMMARY OF THE INVENTION

It is, therefore, an object of the present invention to provide an airbag which allows easy enhancement in the deployment characteristics with reduced manufacturing cost. Another object of the present invention is to provide a method of folding such airbag.

The present invention generally provides an airbag mounted to a support member for restraining an object, comprising: a first cloth fixed to the support member, the first cloth being formed with a gas introduction portion; a second cloth superimposed on the first cloth on the side of the object, wherein the first and second cloths have outer periphery joined to each other, wherein the first and second cloths cooperate to define an airbag compartment; a third cloth interposed between the first and second cloths, wherein the third cloth covers the gas introduction portion on the side of the object; a junction which joins the first and third cloths together; a passage defined between the first and third cloths for communication between the gas introduction portion and the outer periphery of the first cloth; an exhaust hole arranged in the junction for communication between the third cloth on the object side and the first cloth on the counter-object side; and a connecting member having one end connected to at least one of the first and third cloths and another end connected to the second cloth.

A main feature of the present invention is to provide such airbag which is prepared by a process comprising: superimposing the first and second cloths on the third cloth; folding the connecting member; and superimposing the folded connecting member on the exhaust hole, wherein the folded connecting member conceals at least part of the exhaust hole.

BRIEF DESCRIPTION OF THE DRAWINGS

The other objects and features of the present invention will be apparent from the following description with reference to the accompanying drawings, wherein.

DETAILED DESCRIPTION OF THE INVENTION

Figure 1A:
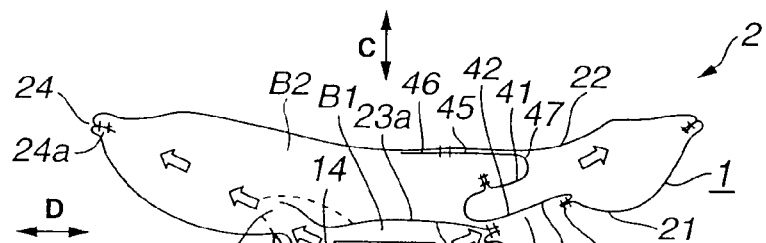
FIG. 1A is a sectional view taken along the line I-O-IA in FIG. 4 and showing an initial stage of deployment of an airbag embodying the present invention.

Referring to the drawings, a description will be made with regard to an airbag and a folding method thereof embodying the present invention.

Referring to FIGS. 1A–5, an airbag 1 constitutes an airbag arrangement 2 that is mounted to a steering wheel 3 of a motor vehicle at a main body or a mount member 4 so as to alleviate an impact to be applied to an occupant or object to be restrained A (see FIG. 1D) in the event of vehicle collision. Ordinarily, the steering-wheel main body 4 is mounted to an inclined steering shaft, not shown, for its use in the inclined state. Hereafter refer to the side having the airbag arrangement 2 or the object side as occupant side, upper side or face side, and to the counter-object side or the side opposite to the occupant side as body side, lower side or back side. Moreover, refer to the vehicle upper-front side or the front-glass side as front side, and to the vehicle lower-rear side as the rear side.

The steering-wheel main body 4 comprises an annular rim or holder 5 called also a grip or ring, a boss 6 disposed inside the rim 5, and a plurality of, e.g. three or four, spokes 7 for connecting the rim 5 and the boss 6. The boss 6 includes a boss portion 6a with which the steering shaft is engaged.

The airbag arrangement 2 comprises a base plate or support 11 and members mounted thereto, such as airbag 1, inflator 12, retainer 14, and housing 15.

The base plate 11 is obtained, for example, by pressing a metal plate, and has a substantially rectangular base portion and a peripheral portion obtained by integrally downwardly bending the outer periphery of the base portion. The base portion has a circular inflator hole formed substantially in the center, and a plurality of, e.g. four, bolt holes formed therearound. The peripheral portion includes mounting lugs mounted to a core bar of the boss 6 of the steering-wheel main body 4.

Figure 2:
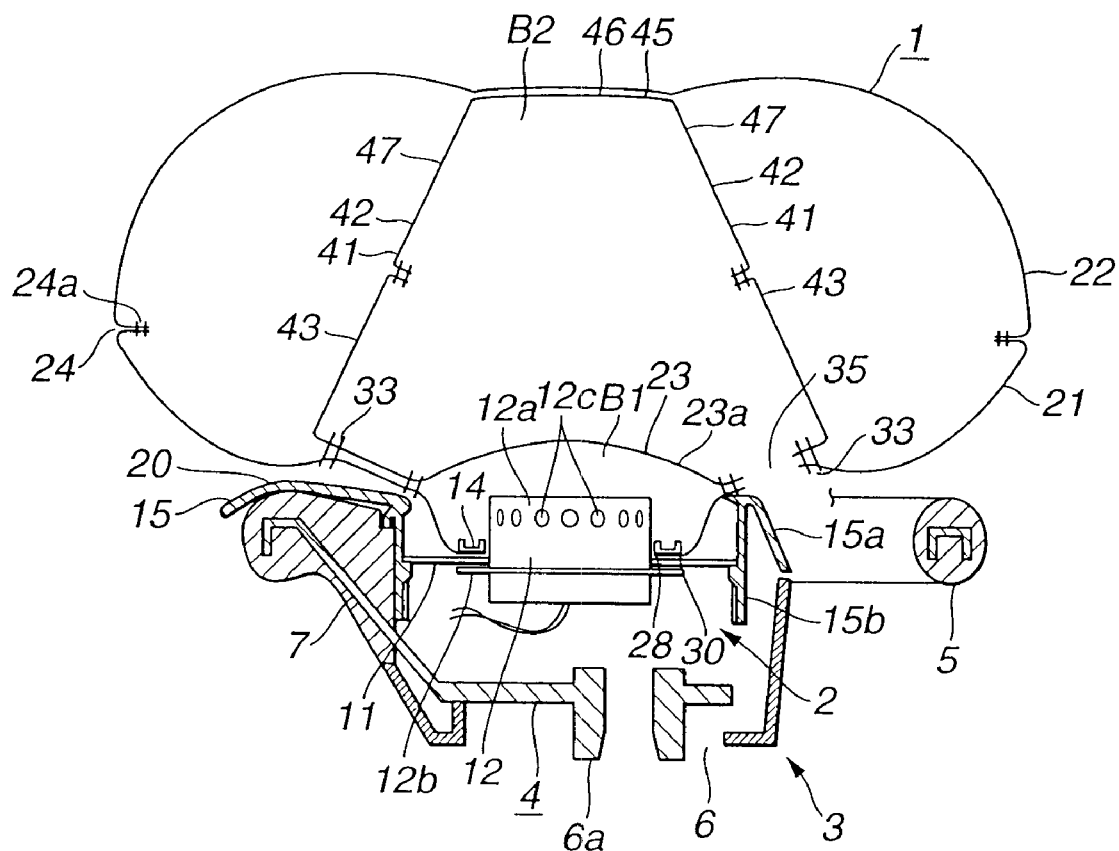
FIG. 2 is a view similar to FIG. 1D, taken along the line II-O-IIA in FIG. 4 and showing the airbag deployed.

As best seen in FIG. 2, the inflator 12 includes a substantially cylindrical main body 12a and a flange 12b protruding from the outer periphery thereof. The inflator 12 has gas injection ports 12c formed above the flange 12b. The flange 12b is formed with boltholes that communicate with those of the base plate 11.

The retainer 14 includes a main body formed, for example, like a ring, to which mounting bolts are fixed downwardly to engage with corresponding boltholes.

The housing 15 is formed in one piece out of synthetic resin, and includes a cover 15a with curved surface for partly covering the boss 6 and the spokes 7 of the steering-wheel main body 4 and a rectangular-tube-like mounting wall 15b arranged to protrude downwardly from the lower side of the cover 15a. The lower side of the cover 15a and the inside of the mounting wall 15b cooperate with each other to define a storage space of the airbag 1. The mounting wall 15b, engaged with the outer periphery of the peripheral portion of the base plate 11, is fixed thereto by tightening a belt or using rivets. The lower side of the cover 15a is formed with a tear line or a predetermined fragile portion shaped, e.g. substantially like a letter H as viewed in plan to face the storage space of the airbag 1. At deployment of the airbag 1, the cover 15a is broken along the tear line, which forms a door 20 that opens rotatively.

Figure 5:
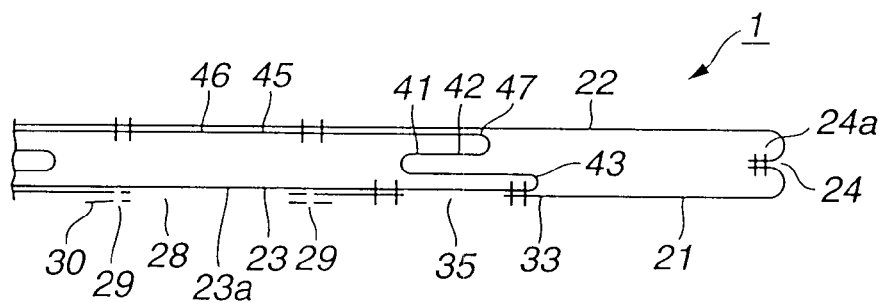
FIG. 5 is a fragmentary sectional view showing the airbag in FIG. 4.

As best seen in FIGS. 2 and 5, the airbag 1 includes a first circular cloth 21 on the body side, a second circular cloth 22 on the occupant side, and a third circular cloth 23 of small diameter disposed in an outer shell defined by the first and second cloths 21, 22. The cloths 21, 22, 23, called also plates (lower plate, upper plate, and middle plate) or panels (back panel, face panel, and center panel), include a nylon woven, for example. In the first embodiment, each cloth includes a nylon 66 woven and a 350 dtex thread wherein the weaving number is 24.4 yarns/cm or 62 yarns/in both in the warp and weft directions, and it is of the so-called non-coated type having with no coating of resin, for example.

The first and second cloths 21, 22 are placed one upon another, and sewn together along an outer peripheral sewing portion 24a of an outer edge 24 obtained by multi-thread chain stitch. Then, the sewn cloths 21, 22 are reversed to provide a flat bag-like outer shell with an edge or seam of the outer edge 24 of the cloths 21, 22 facing inwardly. In the first embodiment, the outer peripheral sewing portion 24a uses nylon 66 threads wherein a needle thread is 1,395 dtex (=1,260 denier), a bobbin thread is 930 dtex (=840 denier), and the number of stitches is 3.5 times/cm).

Figure 4:
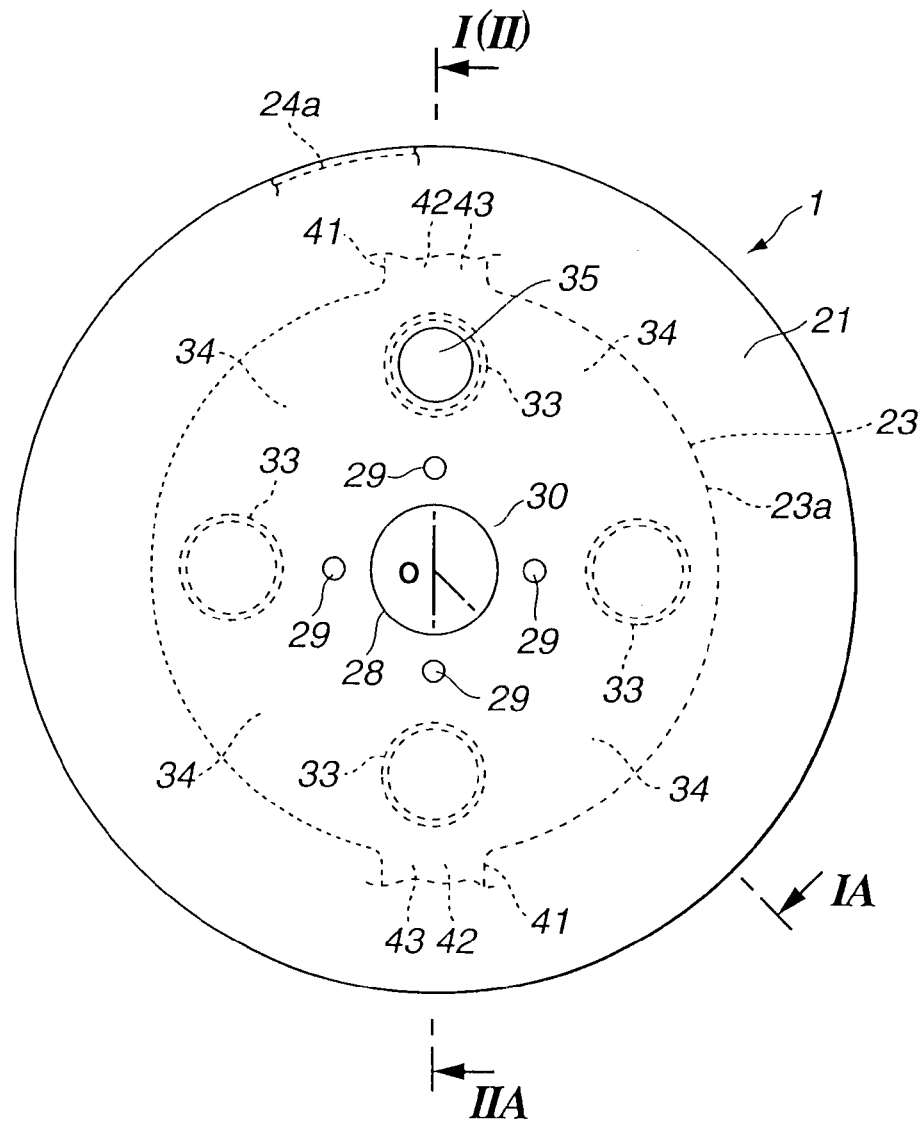
FIG. 4 is a bottom view showing the airbag spread on a plane.

As seen in FIG. 4, the first cloth 21 fixed to the base plate 11 has a gas introduction port or portion 28 formed in the center to receive the main body 12a of the inflator 12. Circular boltholes or airbag fixing holes 29 are formed around the gas introduction port 28 for receiving mounting bolts of the retainer 14. As best seen in FIG. 2, an annular mount 30 having the boltholes 29 is disposed below the base plate 11 to surround the gas introduction port 28.

The third cloth 23, also called a gas restraining panel, includes a circular panel portion 23a having smaller radius than that of the first and second cloths 21, 22. Specifically, the panel portion 23a has a radius slightly larger than ½ radius of the first and second cloths 21, 22, for example, and is disposed concentrically with respect to the first and second cloths 21, 22 to conceal the gas introduction port 28 and the perimeter thereof. As best seen in FIG. 4, the third cloth 23 is joined to the first cloth 21 by sewing or the like at a plurality of, e.g. four, spots or junctions 33 in the vicinity of the outer periphery of the third cloth 23. In the first embodiment, the junctions 33, each formed substantially hermetically through circular double stitches, are disposed circumferentially equidistantly or radially to surround the gas introduction port 28. It is noted that the sewing conditions of the junctions 33 such as thread and number of stitches are the same as those of the outer peripheral sewing portion 24a except using lock stitch.

A portion of the airbag 1 between the adjacent junctions 33 and between the outer periphery of the third cloth 23 and the fist cloth 21 forms a passage 34 that allows passage of gas introduced from the gas introduction port 28. As seen in FIGS. 1A–1D, an upstream portion of the passage 34 defined between the first and third cloths 21, 23 forms a first compartment B1, and a downstream portion of the passage 34 between the first and third cloths 21, 23 and the second cloth 22 forms a second compartment B2.

At least one of the junctions 33, e.g. front junction 33, has a vent hole or exhaust portion 35 formed therein. Specifically, the vent hole 35 does not allow communication between the inside and outside of the airbag 1 on the lower side of the third cloth 23, i.e. in the first compartment B1, but on the upper side of the third cloth 23, i.e. in the occupant-side or second compartment B2. The vent hole 35 communicates with the outside of the airbag 1 on the lower side or counter-occupant side.

Figure 3:
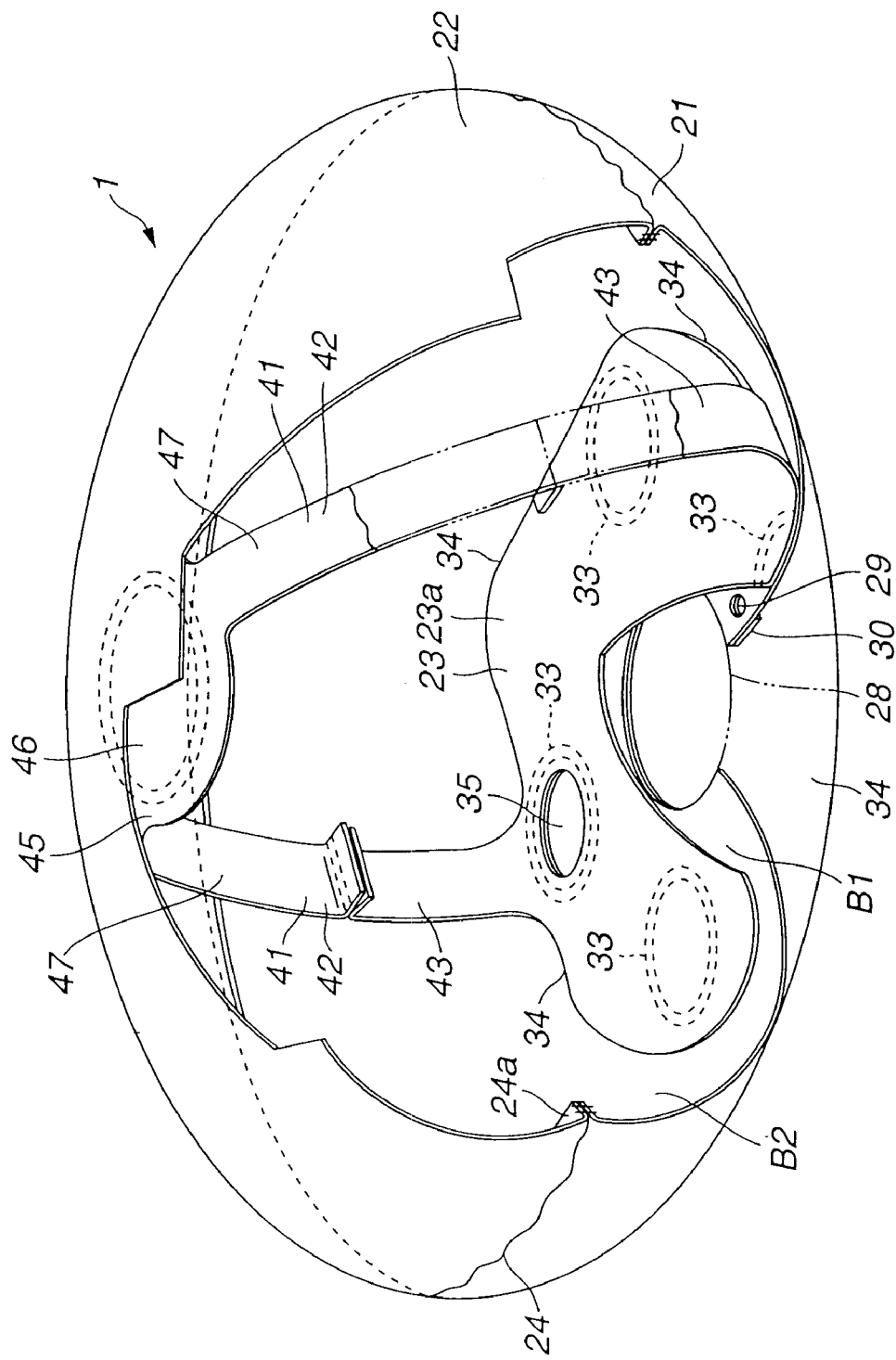
FIG. 3 is a perspective view, partly in broken, showing the airbag deployed.

The airbag 1 also includes at least one band or tether belt 41 as connecting member or means. In the first embodiment, two bands 41 are arranged to connect the third and second cloths 23, 22. As best seen in FIG. 3, each band 41 includes a belt portion 42 of a predetermined width, which comprises a plurality of, e.g. two, lower belt portions 43 extending integrally diametrally from particular spots of the third cloth 2, and a plurality of, e.g. two, upper belt portions 47 extending integrally diametrally from particular spots of a patch or mounting portion 46 of an upper belt member 45, wherein the corresponding lower belt portions 43 and upper belt portions 47 are joined to each other. One of the lower belt portions 43 is disposed adjacent to the vent hole 35, and it is located, in the first embodiment, at the outer periphery thereof. The upper belt member 45 is of the same material as that of the cloths, for example. The patch 46 is shaped like a circle in plan, and sewn to the center of a circle of the second cloth 22. The lower belt portion 43 and the upper belt portion 47 are joined to each other with opposite ends superimposed and sewn. In the first embodiment, the opening of the vent hole 35 has 50 mm diameter, whereas the belt portion 42 has 70 mm width, which is greater than the former, allowing the belt portion 42 to substantially cover the vent hole 35. It is noted that the recitation "substantially cover the vent hole 35" involves not only the state where the cloth members are hermetically superimposed without any minute clearance, but the state where they are superimposed in close contact or with a slight clearance by presence of wrinkles, or the state where the belt portion 42 conceals most of the opening of the vent hole 35.

When assembling the airbag arrangement 2, the retainer 14 is inserted into the airbag 1 for engagement of the mounting bolts with the corresponding boltholes 29 of the airbag 1 and the base plate 11. The airbag 1 is folded in a predetermined shape such as petal, on which the housing 15 is disposed from above for engagement with the base plate 11. Then, through the inflator hole of the base plate 11 and the gas introduction port 28 of the airbag 1, an upper portion of the inflator 12 is inserted into the airbag 1 from below. And the mounting bolts are engaged with the corresponding boltholes of the flange 12b, which are tightened by nuts from below. With this, the first cloth 21 and the base plate 11 of the airbag 1 are tightly held between the retainer 14 and the inflator 12, i.e. the members 21, 11, 14, 12 are tightened together by nuts, obtaining assembled airbag arrangement 2.

The airbag arrangement 2 is mounted to the steering wheel 3 by fixing the mounting lugs of the base plate 11 to the core bar of the boss 6 of the steering-wheel main body 4 through bolts or the like.

In the event that the motor vehicle with airbag arrangement 2 undergoes a collision impact, an electronic control unit (ECU), not shown, actuates the inflator 12 to promptly jet gas into the airbag 1 from the gas injection ports 12c of the inflator 12. Then, the airbag 1 breaks the housing 15 along the tear line to rotate the door 20, forming a projection opening. The airbag 1 is inflated through the projection opening to form a predetermined shape in front of the occupant A so as to hold and restrain the occupant A thrown forward, alleviating an impact to be applied thereto.

Referring particularly to FIGS. 1A–1D, a detailed description will be made with regard to folding of the airbag 1 and inflating action thereof, When folding the airbag 1, the first and second cloths 21, 22 and the panel portion 23a of the third cloth 23 are superimposed to have the plate-like shape as a whole as seen in FIG. 5. At that time, the band 41 is folded to have the belt portion 42 turned up at an end on the side of the panel portion 23a of the third cloth 23 and superimposed thereon. This allows one of the bands 41 to cover the vent hole 35 located in the vicinity of the base of the band 41. Since the width of the belt portion 42 is larger than the diameter of the opening of the vent hole 35 as described above, the band 41 wholly conceals the vent hole 35.

While maintaining as much as possible the state where the band 41 covers the vent hole 35, the airbag 1 is pressed from the outer periphery to the center for obtaining a wavelike accumulation. Moreover, the airbag 1 is rotated to have the bands 41 wound around the perimeter of the accumulation, achieving the shape of the airbag 1 which can be accepted in the housing 15.

The deployment process of the airbag 1 is as follows. It is noted that open arrows in FIGS. 1A–1D show gas flow schematically, and arrows C, D in FIG. 1A show a vertical direction and a direction perpendicular thereto or horizontal direction, respectively.

FIG. 1A shows airbag arrangement 2 immediately after the airbag 1 breaks the housing 15 along the tear line to open the door 20. First, gas jetted from the inflator 12 is radially introduced to the lower side of the third cloth 23 in the airbag 1 through the third cloth 23. Since the third cloth 23 is connected to the first cloth 21 through the junctions 33 disposed around the gas introduction port 28, and the first cloth 21 is fixed to the base plate 11, the third cloth 23 is maintained in the state of slightly expanding to the occupant A, i.e. with a small height or protrusion amount. Then, gas is introduced into the airbag 1 at the outer periphery through the passage 34 to deploy the airbag 1 horizontally flatly. At that time, the band 41 does not undergo any tension, maintaining concealment of the vent hole 35. This prevents a gas leakage from the vent hole 35 to allow efficient use of the gas pressure.

Figure 1B:
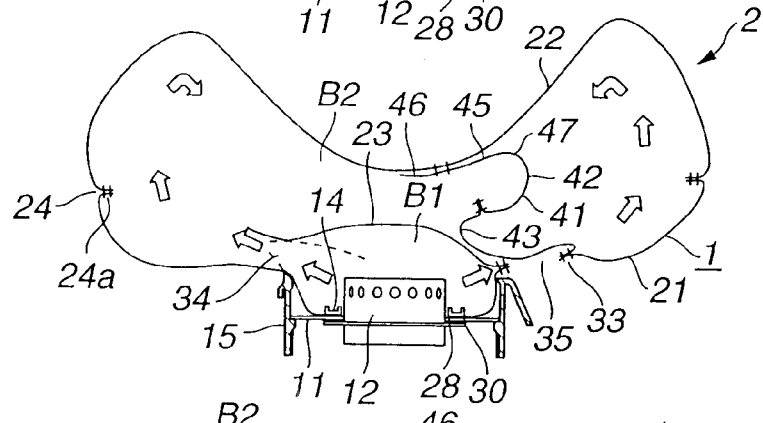
FIG. 1B is a view similar to FIG. 1A, taken along the line I-O-IA in FIG. 4 and showing the state subsequent to that shown in FIG. 1A.

FIG. 1B shows airbag arrangement 2 with the airbag 1 deployed further. Gas is turned around in a three-dimensional way in the vicinity of the outer edge 24, so that the airbag 1 has outer periphery expanding upwardly, but with little change in the height of a center portion. At that time also, the band 41, which is not fully stretched, conceals the vent hole 35 since the height of the center portion of the airbag 1 is smaller than the length of the band 41. This prevents a gas leakage from the vent hole 35 to allow efficient use of the gas pressure.

Figure 1C:
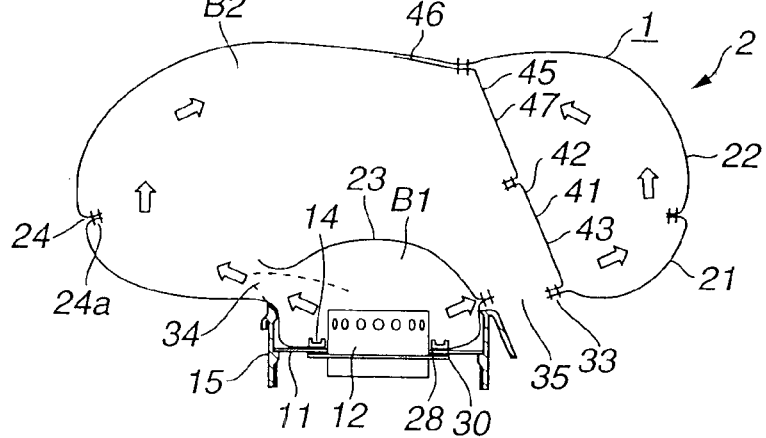
FIG. 1C is a view similar to FIG. 1B, taken along the line I-O-IA in FIG. 4 and showing the state subsequent to that shown in FIG. 1B.

FIG. 1C shows airbag arrangement 2 with the airbag 1 deployed still further or completely. Gas which has inflated the airbag 1, particularly, from the outer periphery of the second cloth 22 is then introduced into a center portion of the second compartment B2 to inflate the airbag 1 in its entirety in a predetermined shape. At that time, the band 41 undergoes tension to come in the stretched state, and thus separates from the vent hole 35 to work to restrain the height of the center portion of the airbag 1. Even in that state, gas derived from the inflator 12 strikes the stitches of the junctions 33 on the inflator side, while the band 41 located opposite to the junctions 33 with respect to gas flow shares a load, resulting in enhanced strength. Moreover, since the position where the band 41 is mounted to the third cloth 23 corresponds to the position where the band 41 is sewn to the first cloth 21, tension produced by the gas pressure pressing the first cloth 21 outwardly can serve to support the band 41, leading to the band 41 retained without moving upwardly. In such a way, the height or protrusion of the airbag 1 with respect to the occupant A can be determined to a predetermined value without having any excess or lack. The protrusion restrained by the band 41 can be determined, for example, in accordance with the Federal Motor Vehicle Safety Standards (FMVSS) No. 208.

Figure 1D:
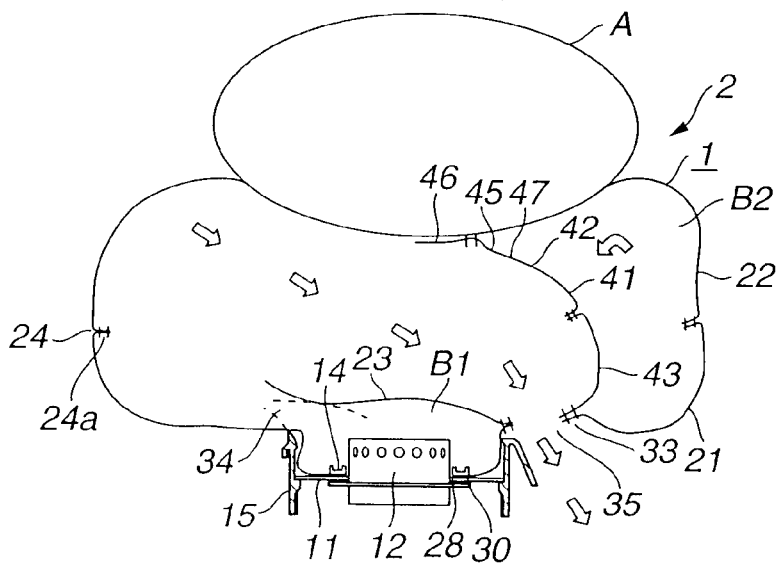
FIG. 1D is a view similar to FIG. 1C, taken along the line I-O-IA in FIG. 4 and showing the state subsequent to that shown in FIG. 1C.

FIG. 1D shows airbag arrangement 2 with the airbag 1 in the state immediately after the state in FIG. 1C, wherein the occupant A is received by the airbag 1, and gas is exhausted from the vent hole 35 communicating with the outside of the airbag 1 on counter-occupant side.

As described above, in the first embodiment, there is provided airbag 1 wherein the first and second cloths 21, 22 constitute outer shell, and the third cloth 23 which is smaller than the two cloths 21, 22 is arranged therein to define first and second compartments B1, B2. Applicant refers to the airbag 1 having such structure as 2.5-layer type airbag. Since the vent hole 35 for communication between the second compartment B2 and the outside of the airbag 1 can be covered with the band 41, gas is not exhausted outside throughout the deployment process from the first compartment B1 which is not in direct communication with the outside of the airbag 1. Moreover, since the vent hole 35 is covered with the band 41 in the first half of deployment, gas introduced from the first compartment B1 into the second compartment B2 in the deployment process works to inflate the airbag 1 substantially in its entirety with no wastage. After that, the airbag 1 contacts the occupant A to absorb and alleviate an impact to be applied thereto. Specifically, the band 41 separates from the vent hole 35 to open it, through which gas is exhausted from the second compartment B2 to the outside of the airbag 1, achieving restraint of the occupant A in such a way as to adequately alleviate an impact to be applied thereto.

Moreover, the 2.5-layer type airbag 1 can easily achieve desired deployment characteristics by the third cloth 23 and the bands 41 disposed inside the outer shell, i.e. desired deployment action of promptly deploying the outer periphery of the airbag 1 and then expanding the center portion thereof. This allows easy alleviation of the pressure to be applied to the occupant A closely adjacent to the steering wheel 3 and thus the airbag 1, for example, i.e. out of position, providing effective out-of-position measures.

Further, gas does not flow beyond the vent hole 35 in the deployment process of the airbag 1, and the band 41 having the width large enough to substantially cover the vent hole 35 serves as a valve for closing the vent hole 35 in the first half of deployment and opening it in the second half of deployment, resulting in effective use of gas.

Furthermore, without relying upon a system including a high-priced complicated valve, an electronic control unit and sensors, operations such as enhanced deployment characteristics and effective use of gas described above can very easily be obtained with the third cloth 23 formed out of a low-priced and easily available woven similar to that for the main cloth of the airbag 1 and for partly partitioning the inside of the airbag 1 to direct gas flow to the outer periphery thereof, and the bands 41 one of which has the base in the vicinity of the vent hole 35 for restraining gas exhausted from the vent hole 35 in the first half of deployment. This allows easy enhancement in the deployment characteristics of the airbag 1 and effective application of the gas generating capability of the inflator 12, resulting in maximally reduced size of the inflator 12 with respect to the volume of the airbag 1. This leads to a reduction in manufacturing cost and size/weight of the devices such as airbag, a facilitation of treatment of unused agent during scrapping of vehicles, etc., greatly contributing to a reduction in overall cost.

Further, since the third cloth 23 is smaller than the first and second cloths 21, 22 in outer dimension, e.g. in diameter in the illustrative embodiment wherein the cloths are circular, the passage or gas-flow path 34 can easily be defined between the outer periphery of the third cloth 23 and the outer edge 24 of the airbag 1. Moreover, compared with an airbag including a plurality of compartments defined by a cloth of the same dimension as that of an outer-shell forming cloth, the 2.5-layer airbag 1 can be manufactured easily. By way of example, a so-called 3-layer airbag using three cloths needs to sew the three cloths together, which leads to complicated positioning, difficult sewing, hardened seams, difficult reversing of the airbag, etc., while the 2.5-layer airbag 1 is obtained such that the first and third cloths 21, 23 and the first and second cloths 21, 22 are sewn together, respectively, which facilitates work of reversing the first and second cloths 21, 22 to have the outer seam or edge of the two turned inside the outer shell.

Furthermore, reduced size of the third cloth 23 contributes to a reduction in cloth consumption and thus manufacturing cost, and also a reduction in bulk of the airbag when folded. Moreover, the two-layer airbag is superior in flexibility and foldability to the three-layer airbag, allowing easy formation of a waveform by automatic folding. Moreover, reduced size of the third cloth 23 allows a reduction in weight and folded shape, and easy manufacturing of the airbag 1 and its assembling to the airbag arrangement 2, resulting in reduced manufacturing cost of the airbag arrangement 2.

Further, since gas jetted from the inflator 12 is cooled down during long-distance travel in the airbag 1, and is exhausted from the vent hole 35 dented by being pulled by the third cloth 23 to the outside of the airbag 1 on the counter-occupant side, the inflator 12 may be of the type wherein injecting gas is relatively high in initial temperature, enlarging the selectablity of the inflator type, resulting in applicability of a low-priced inflator. Moreover, due to no need of severe heat provisions for the perimeter of the vent hole 35, etc., the airbag 1 can be manufactured with reduced cost.

Moreover, since the junction 33 is formed annularly by sewing, only locating the opening inside the junction 33 can easily provide the vent hole 35 for communication between the occupant side and the counter-occupant side of the third cloth 23, resulting in simplified structure and thus reduced manufacturing cost.

Further, since the band 41 is connectively arranged downstream of the vent hole 35 with respect to gas flow, a support point of the band 41 can be determined at a spot out of gas flow toward the junction 33, preventing a load resulting from the gas pressure from concentrating at a particular point of action.

Furthermore, since the junction 33 is of the annular shape, i.e. it includes a smooth convex curve at least at an edge facing the gas introduction port 28, smooth guide of gas to the passage 34 can be achieved without convection compared with the structure including, e.g. a concave curve at an edge facing the gas introduction port 28, resulting in efficient use of the gas pressure. Moreover, the presence of a smooth convex curve can prevent a stress concentration from occurring at deployment of the airbag 1, resulting in a reduction in manufacturing cost without increasing more than necessary the mechanical and thermal strength of stitches of the junction 33.

Further, since at least part of the band 41 is integrated with the third cloth 23, a reduction is possible in the number of parts and thus manufacturing cost.

In the first embodiment, the 2.5-layer airbag 1 is used wherein the third cloth 23 is smaller than the first and second cloths 21, 22. Optionally, a plurality of cloths may be arranged inside an outer-shell forming cloth. Moreover, the outer dimension or diameter of the cloths arranged in the outer-shell forming cloth may be determined to be equal to that of the outer-shell forming cloth so as to have the outer peripheries sewn together.

Moreover, in the first embodiment, four junctions 33 are arranged, one of which has vent hole 35 formed therein. It is noted that the structure of the junctions 33, i.e. the passage 34 defined between the junctions 33 and the number of vent holes 35, can be modified as appropriate.

Figure 6:
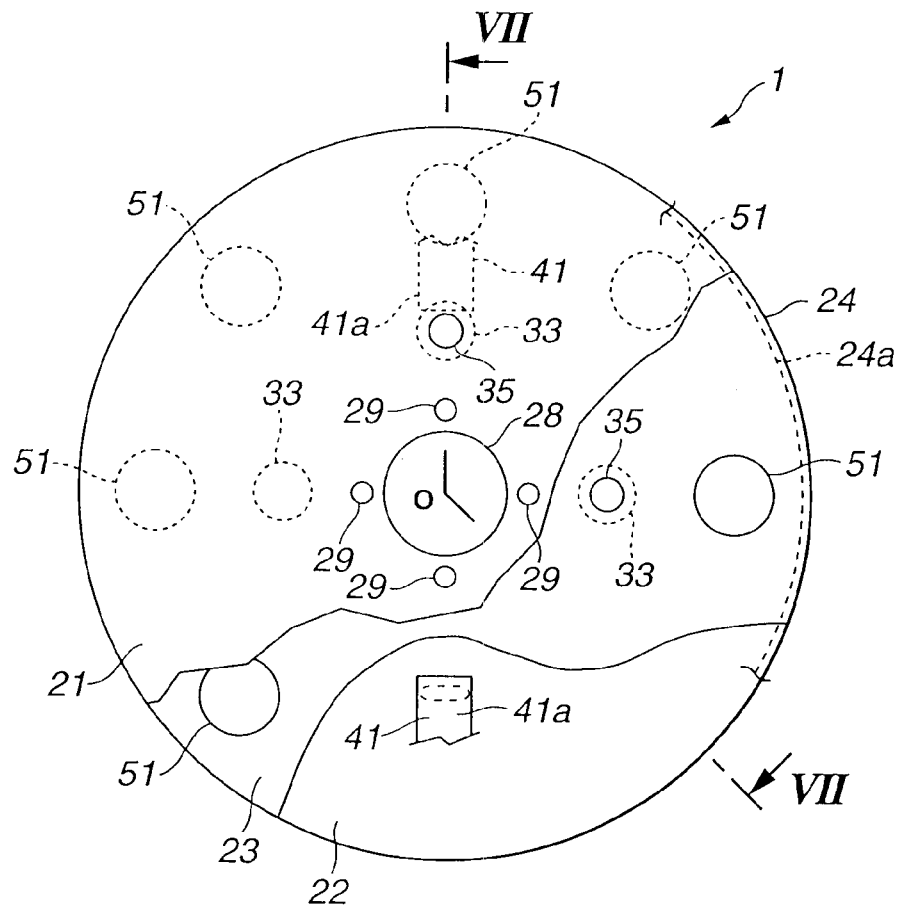
FIG. 6 is a view similar to FIG. 4, partly in broken, showing a second embodiment of the present invention.
Figure 7:
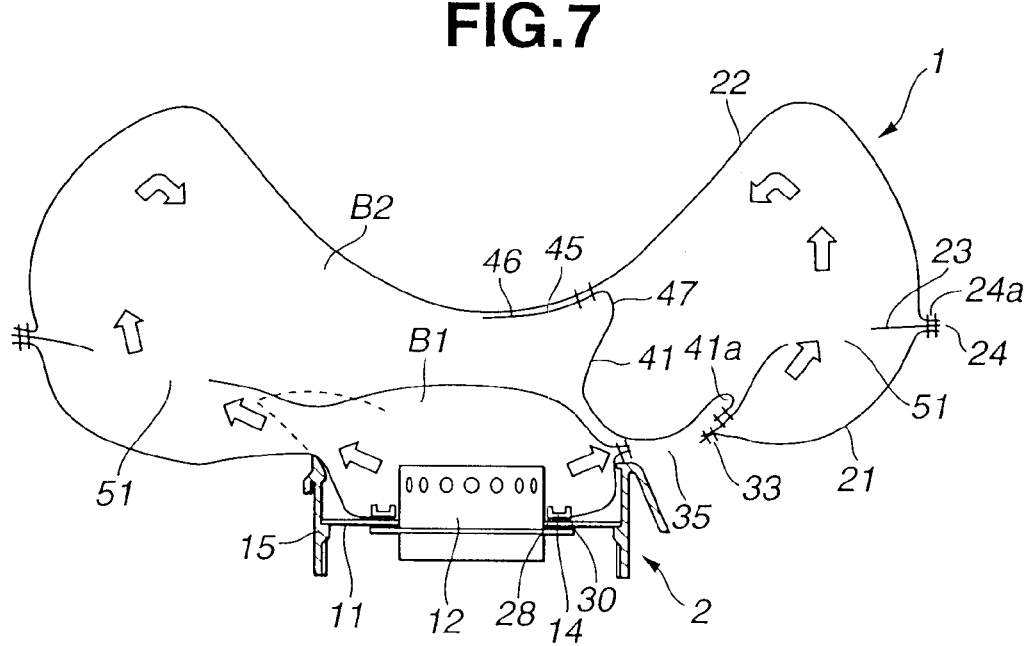
FIG. 7 is a view similar to FIG. 2, taken along the line VII—VII in FIG. 6.

By way of example, referring to FIGS. 6–7, in the second embodiment, the airbag 1 is of the so-called 3-layer type wherein the third cloth 23 is of the same outer shape as that of the first and second cloths 21, 22, and the three cloths 21, 22, 23 are placed one upon another to have the outer peripheries sewn together. In the second embodiment, the third cloth 23 is interposed between the first and second cloths 21, 22 to define the first and second compartments B1, B2 disposed one under another, and a plurality of, e.g. eight, circular communicating holes 51 constituting a passage or gas-flow path in the vicinity of the outer periphery are formed to ensure communication between the first and second compartments B1, B2. In the same way as in the first embodiment shown, e.g. in FIG. 4, the first and third cloths 21, 23 are joined to each other by sewing or the like through the four junctions 33 circumferentially equidistantly disposed at the inner periphery with respect to the communicating holes 51. In the second embodiment also, each junction 33 is formed substantially hermetically through circular double lock stitches which are schematically shown by one broken line in FIG. 6. Two of the adjacent junctions 33 have a vent hole 35 for communication between the second compartment B2 and the outside of the airbag 1.

The bands or connecting member or means 41 include a separate and distinct member from the third cloth 23, each including an upper belt portion 47 extending integrally diametrally from two spots of the patch or mounting portion 46 of the upper belt member 45. The upper belt portion 47 has an end or base 41a joined to the junction 33 in the vicinity of the outer periphery by sewing to restrain a clearance between the second and third cloths 22, 23. Moreover, since the end 41a of the band 41 is adjacent to the junction 33, the band 41 substantially restrains a clearance between the first and second cloths 21, 22. In the second embodiment, one of the bands 41 is disposed adjacent to one of the vent holes 35 so as to close the vent hole 35 in the first half of deployment for efficient use of gas, and separate from the vent hole 35 to open it in the second half of deployment for smooth gas exhaust. In the second embodiment, the vent hole 35 is shaped in a circle of 35 mm diameter, and the band 41 is of the 80 mm width.

In the second embodiment, another vent hole 35 is not adjacent to the band 41 so as to be normally open. Optionally, the bases of the bands 41 may be disposed adjacent to one vent hole 35 to only operate on this vent hole 35 for opening and closing. Certain effect can be expected by this alternative.

The behavior of the airbag 1 in the deployment process is similar to that of the airbag 1 in the first embodiment. By way of example, referring to FIG. 7 which shows the stage corresponding to that in FIG. 1B, the outer periphery of the airbag 1 is lifted by gas introduced through the communicating holes 51, while the band 41 overlies and conceals the vent hole 35 to prevent gas from being easily exhausted to the outside of the airbag 1.

Moreover, in the second embodiment, the bands 41 can be disposed adjacent to the vent holes 35 which is arranged on the diagonal.

Further, in the second embodiment, the number of bands 41 is two, optionally, it may be four, for example.

Figure 8:
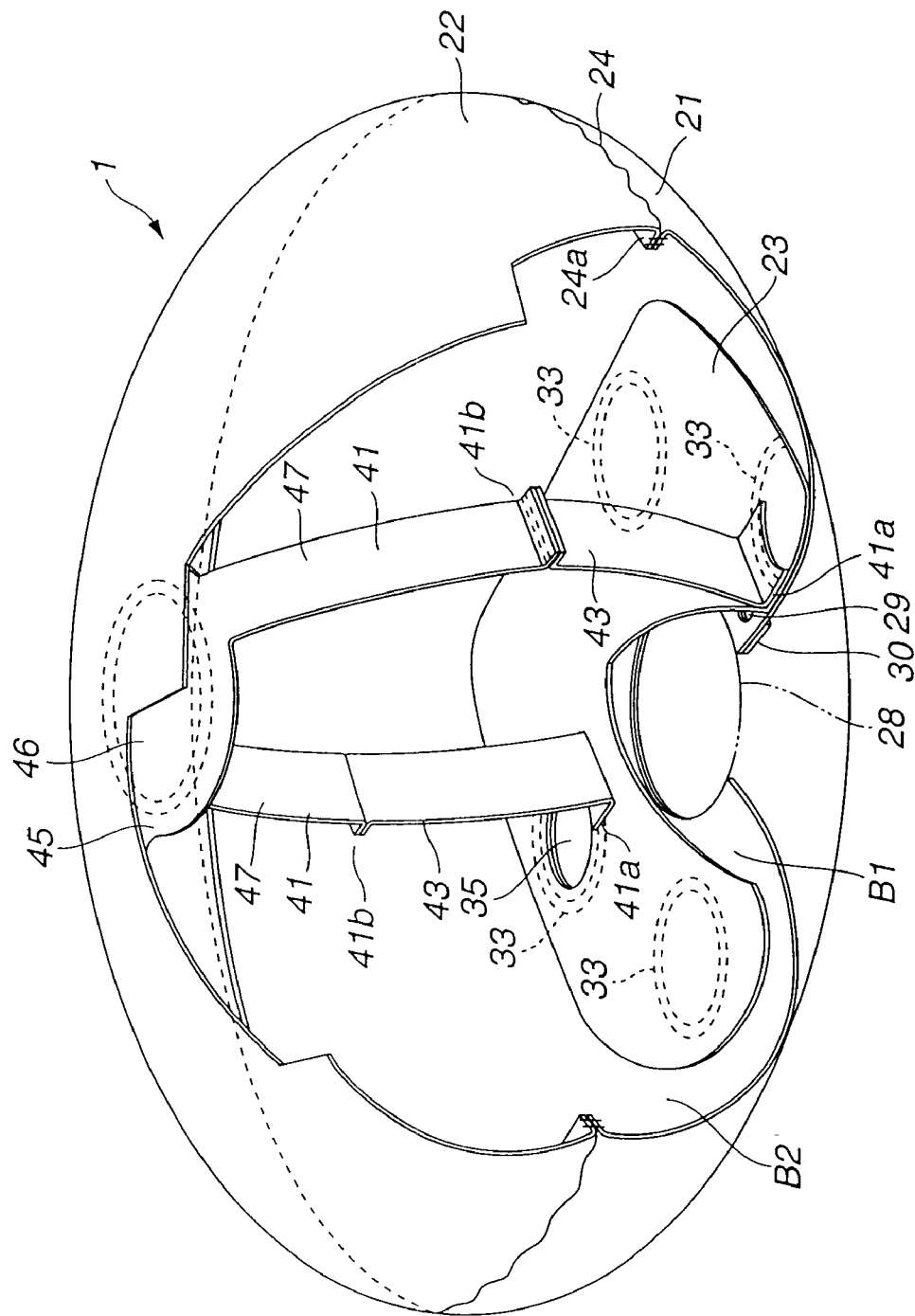
FIG. 8 is a view similar to FIG. 3, showing a third embodiment of the present invention.

Furthermore, in the first and second embodiments, the band 41 is connectively arranged at the outer periphery of the vent hole 35 and thus the junction 33, i.e. downstream with respect to gas flow in the first compartment B1. Optionally, the band 41 may be arranged at other position. By way of example, referring to FIG. 8, in the third embodiment, the end 41a of the band 41 is connected to the third cloth 23 by sewing at the inner periphery of the junction 33, or at the inner radius of the airbag 1, or upstream with respect to gas flow in the first compartment B1. In addition to the fact that the end 41a of the band 41 is connected to an edge of the vent hole 35 close to the inflator 12, the third embodiment differs from the first embodiment in that the band 41 is formed with the lower belt portion 43 including a separate and distinct member from the third cloth 23.

In the third embodiment, compared with the first embodiment, the end 41a of the band 41 can be disposed close to the retainer 14 serving as a fixing spot to the base plate 11, i.e. the band 41 can be connected to the third cloth 23 close to the center of support for the airbag 1, resulting in easy achievement of stabilized shape of the airbag 1 at deployment. Moreover, the end or base 41a of the band 41 is adjacent to the vent hole 35. When folding the airbag 1, the band 41 is folded from the middle portion, for example, which is doubled flat in such a way as to extend to the outer edge 24, or accumulated like corrugation in the direction of the center of the airbag 1. In that state, the vent hole 35 is closed by a middle portion 41b of the band 41 as folded, restraining gas leakage at the stage prior to the deployment process of the airbag 1 in the same way as in the first and second embodiments.

In the 3-layer airbag wherein the diameter of the third cloth 23 is equal to that of the first and second cloth 21, 22, and the 2.5-layer airbag 1 having third cloth 23 of smaller diameter, a connection or an end of the band 41 for connecting the band 41 and the third cloth 23 may be constructed in various forms.

By way of example, an end of the band 41 may be branched into a plurality of, e.g. two, portions, which are connected to the inner and outer peripheries of the vent hole 35 and thus junction 33 with respect to gas flow. In this alternative, the band 41 can be disposed on the vent hole 35 in accordance with the typical folding direction of the band 41 taken when folding the airbag 1, facilitating folding work of the airbag 1.

Figure 9:
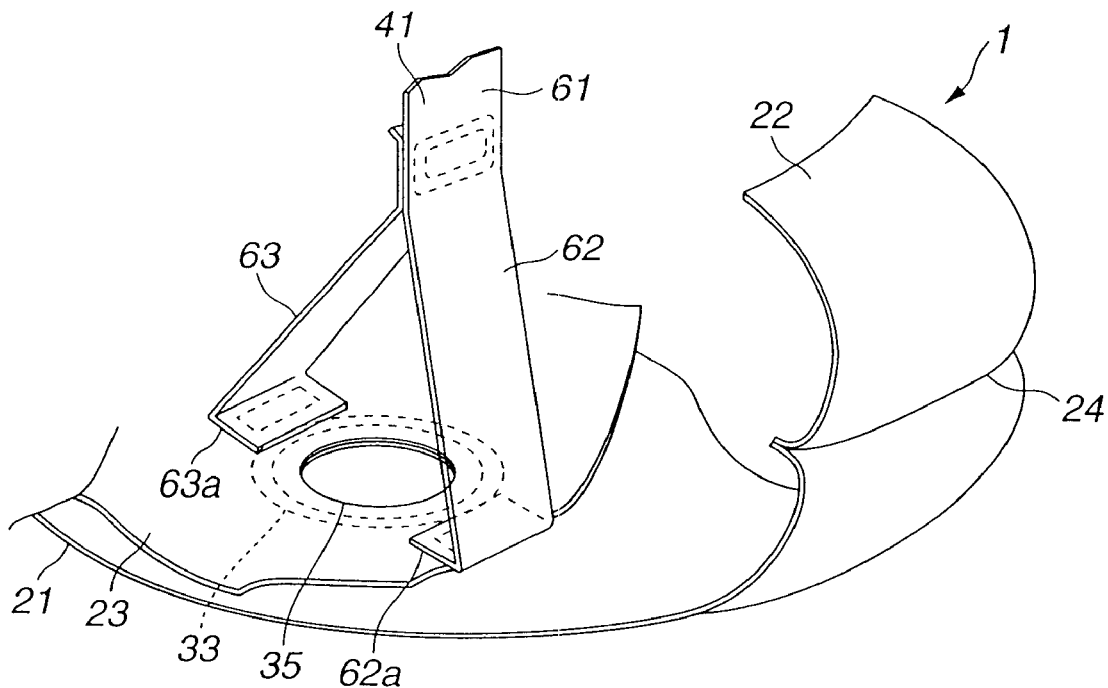
FIG. 9 is a fragmentary perspective view, partly in broken, showing a fourth embodiment of the present invention.

By way of example, referring to FIG. 9, in the fourth embodiment, the band 41 is shaped like an inverted Y letter, and comprises an upper belt portion 61, a first lower belt portion 62 extending integrally from a lower end of the upper belt portion 61, and a second lower belt portion 63 connected to the lower end of the upper belt portion 61 by sewing or the like. An end or tip 62a of the first lower belt portion 62 is connected to the third cloth 23 by sewing or the like at the junction 33 with vent hole 35 at the outer radius of the airbag 1. An end or tip 63a of the second belt portion 63 is connected to the third cloth 23 by sewing or the like at the junction 33 at the inner radius of the airbag 1.

In the fourth embodiment, each end of the band 41 is supported by a support member at a particular spot, and particularly, a belt-like member having a predetermined width includes a plurality of connections which are not arranged in line, allowing restrained transverse deflection of the airbag 1 in the deployment process, resulting in stabilized behavior of the airbag 1. Moreover, when folding the airbag 1, simple superimposition of the first and second cloths 21, 22 allows at least one of the lower belt portions 62, 63 to conceal the vent hole 35, resulting in easy and sure achievement of concealment of the vent hole 35 by the band 41 in accordance with a typical folding process.

In the fourth embodiment, the ends of the lower belt portions may be joined to each other.

Figure 10:
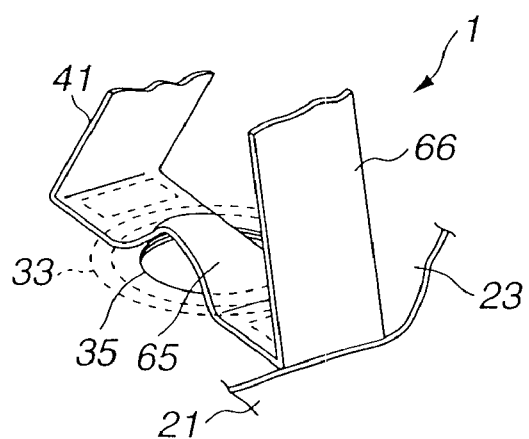
FIG. 10 is a view similar to FIG. 9, showing a fifth embodiment of the present invention.

By way of example, referring to FIG. 10, an end of the band 41 is formed continuously, and a lower belt portion 66 includes a connection 65 for covering the opening of the vent hole 35. In this alternative, the dimensions of the connection 65 are determined to have smaller width and larger length than the diameter of the vent hole 35, leading to easy achievement of the exhaust performance of the airbag 1 at full exhaust in the second half of deployment. Specifically, in FIG. 10, the connection 65 is protuberated to the inside of the airbag 1, while during gas exhaust, it is protuberated to the outside of the airbag 1 through the vent hole 35, forming substantially no obstruction to gas exhaust.

Figure 11:
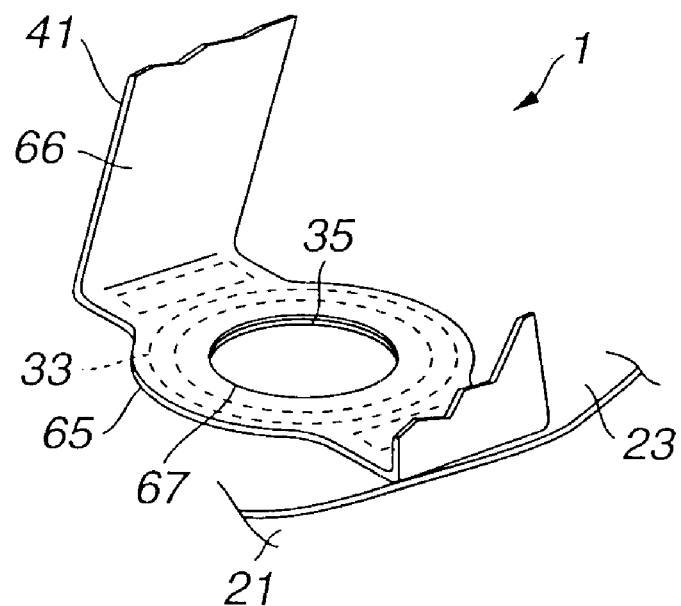
FIG. 11 is a view similar to FIG. 10, showing a sixth embodiment of the present invention.

Moreover, referring to FIG. 11, the structure in FIG. 10 may be modified such that the connection 65 has larger width than the diameter of the vent hole 35, and is formed with a circular through hole 67 corresponding to the vent hole 35. The through hole 67 can be obtained through previous perforation before sewing to the third cloth 23, or by a tool such as laser cutter after sewing thereto. The connection 65 can be shaped annularly, which is circumferentially sewn to the outer edge of the vent hole 35 like a patch for reinforcement thereof.

Figure 12:
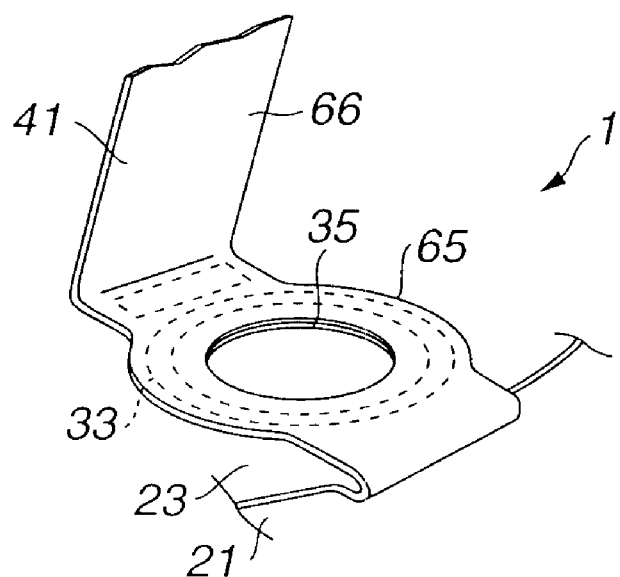
FIG. 12 is a view similar to FIG. 11, showing a seventh embodiment of the present invention.

Further, referring to FIG. 12, in the fifth embodiment, the connection 65 includes an extension from the outer periphery of the third cloth 23, which is turned up to the inner periphery thereof. The connection 65 is sewn to the third cloth 23 around the vent hole 35, and then at the inner radius of the airbag 1 with respect to the vent hole 35. Thus, the lower belt portion 66 is obtained to extend to the second cloth 22.

In the fifth embodiment, in the same way as in the third embodiment, as being connected to the outer edge of the vent hole 35 at the inner radius of the airbag 1, the band 41 can be arranged close to the center of support for the airbag 1, leading to easy achievement of stabilized shape of the airbag 1 at deployment. Moreover, the third cloth 23 and the lower belt portion 66 are integrated with each other, resulting not only in a reduction in the number of parts and thus manufacturing cost, but in reinforcement of the outer edge of the vent hole 35 through a patch-like structure in the same way as in FIG. 11.

Moreover, in addition to being arranged at one spot, the vent hole 35 may be arranged at another spot. Further, the vent hole 35 may be of the polygonal shape in place of circular shape. The cloths can be formed in part with high gas permeability. Moreover, the junction 33 can be of the polygonal or modified shape in place of annular shape.

The airbag 1 can be applied not only to airbag arrangement mounted to the steering-wheel main body for driver restraint, but to airbag arrangement mounted to an instrument panel for assistant-driver restraint, or the side of a seat for side protection, or the rear of the seat for back protection. Moreover, the airbag 1 finds wide application in airbag arrangements for absorbing an impact to be applied to an object to be restrained.

Having described the present invention with regard to the preferred embodiments, it is understood that present invention is not limited thereto, and various changes and modifications can be made without departing from the scope of the present invention.

What is claimed is:

1. An airbag mounted to a support member for restraining an object, comprising:
   a first cloth fixed to the support member, the first cloth being formed with a gas introduction portion;
   a second cloth superimposed on the first cloth on the side of the object, wherein the first and second cloths have outer periphery joined to each other, wherein the first and second cloths cooperate to define an airbag compartment;
   a third cloth interposed between the first and second cloths, wherein the third cloth covers the gas introduction portion on the side of the object;
   a junction which joins the first and third cloths together;
   a passage defined between the first and third cloths for communication between the gas introduction portion and the outer periphery of the first cloth;
   an exhaust hole arranged in the junction for communication between the third cloth on the object side and the first cloth on the counter-object side; and
   a connecting member having one end connected to at least one of the first and third cloths and another end connected to the second cloth.

2. The airbag as claimed in claim 1, wherein the third cloth is disposed in the airbag compartment.

3. The airbag as claimed in claim 2, wherein the third cloth is smaller in diameter than the first and second cloths.

4. The airbag as claimed in claim 1, wherein the one end of the connecting member is disposed adjacent to the exhaust hole, wherein with gas introduced into the airbag compartment, the connecting member restrains a clearance between the cloths connected through the connecting member.

5. The airbag as claimed in claim 1, wherein with the cloths folded, the connecting member conceals at least part of the exhaust hole, and wherein with gas introduced into the airbag compartment, the connecting member restrains a clearance between the cloths connected through the connecting member.

6. The airbag as claimed in claim 1, wherein the connecting member comprises a belt portion having width large enough to substantially close the exhaust hole.

7. The airbag as claimed in claim 1, wherein the one end of the connecting member is disposed upstream of the junction with respect to gas flow derived from the gas introduction portion.

8. The airbag as claimed in claim 1, wherein the one end of the connecting member is disposed downstream of the junction with respect to gas flow derived from the gas introduction portion.

9. The airbag as claimed in claim 1, wherein the one end of the connecting member is branched into a plurality of portions disposed upstream and downstream of the junction with respect to gas flow derived from the gas introduction portion.

10. The airbag as claimed in claim 9, wherein the plurality of portions are connected through a connection, wherein the connection conceals at least part of the exhaust hole.

11. The airbag as claimed in claim 9, wherein the connection is formed with a through hole corresponding to the exhaust hole.

12. The airbag as claimed in claim 11, wherein the connection is integrated with the third cloth.

13. An airbag folded on and mounted to a support member for restraining an object, the airbag comprising:
   a first cloth fixed to the support member, the first cloth being formed with a gas introduction portion;
   a second cloth superimposed on the first cloth on the side of the object, wherein the first and second cloths have outer periphery joined to each other, wherein the first and second cloths cooperate to define an airbag compartment;
   a third cloth interposed between the first and second cloths, wherein the third cloth covers the gas introduction portion on the side of the object;

a junction which joins the first and third cloths together;

a passage defined between the first and third cloths for communication between the gas introduction portion and the outer periphery of the first cloth;

an exhaust hole arranged in the junction for communication between the third cloth on the object side and the first cloth on the counter-object side; and a connecting member having one end connected to at least one of the first and third cloths and another end connected to the second cloth, wherein the airbag is folded in a state that the connecting member is lain on across the exhaust hole.

14. An airbag arrangement for restraining an object, comprising:

a support member;

a first cloth fixed to the support member, the first cloth being formed with a gas introduction portion;

a second cloth superimposed on the first cloth on the side of the object, wherein the first and second cloths have outer periphery joined to each other, wherein the first and second cloths cooperate to define an airbag compartment;

a third cloth interposed between the first and second cloths, wherein the third cloth covers the gas introduction portion on the side of the object;

a junction which joins the first and third cloths together;

a passage defined between the first and third cloths for communication between the gas introduction portion and the outer periphery of the first cloth;

an exhaust hole arranged in the junction for communication between the third cloth on the object side and the first cloth on the counter-object side; and a connecting member having one end connected to at least one of the first and third cloths and another end connected to the second cloth.

15. The airbag as claimed in claim 14, wherein the third cloth is disposed in the airbag compartment.

16. The airbag as claimed in claim 15, wherein the third cloth is smaller in diameter than the first and second cloths.

17. The airbag as claimed in claim 14, wherein the one end of the connecting member is disposed adjacent to the exhaust hole, wherein with gas introduced into the airbag compartment, the connecting member restrains a clearance between the cloths connected through the connecting member.

18. The airbag as claimed in claim 14, wherein with the cloths folded, the connecting member conceals at least part of the exhaust hole, and wherein with gas introduced into the airbag compartment, the connecting member restrains a clearance between the cloths connected through the connecting member.

19. The airbag as claimed in claim 14, wherein the connecting member comprises a belt portion having width large enough to substantially close the exhaust hole.

20. The airbag as claimed in claim 14, wherein the one end of the connecting member is disposed upstream of the junction with respect to gas flow derived from the gas introduction portion.

21. The airbag as claimed in claim 14, wherein the one end of the connecting member is disposed downstream of the junction with respect to gas flow derived from the gas introduction portion.

22. The airbag as claimed in claim 14, wherein the one end of the connecting member is branched into a plurality of portions disposed upstream and downstream of the junction with respect to gas flow derived from the gas introduction portion.

23. The airbag as claimed in claim 22, wherein the plurality of portions are connected through a connection, wherein the connection conceals at least part of the exhaust hole.

24. The airbag as claimed in claim 22, wherein the connection is formed with a through hole corresponding to the exhaust hole.

25. The airbag as claimed in claim 24, wherein the connection is integrated with the third cloth.

26. An airbag mounted to a support member for restraining an object, comprising:

a first cloth fixed to the support member, the first cloth being formed with a gas introduction portion;

a second cloth superimposed on the first cloth on the side of the object, wherein the first and second cloths have outer periphery joined to each other, wherein the first and second cloths cooperate to define an airbag compartment;

a third cloth interposed between the first and second cloths, wherein the third cloth covers the gas introduction portion on the side of the object;

a junction that joins the first and third cloths together;

a passage defined between the first and third cloths for communication between the gas introduction portion and the outer periphery of the first cloth;

an exhaust hole arranged in the junction for communication between the third cloth on the object side and the first cloth on the counter-object side; and means for connecting at least one of the first and third cloths and the second cloth, wherein the connecting means have one end connected to at least one of the first and third cloths and another end connected to the second cloth.

27. An airbag folded on and mounted to a support member for restraining an object, the airbag comprising:

a first cloth fixed to the support member, the first cloth being formed with a gas introduction portion;

a second cloth superimposed on the first cloth on the side of the object, wherein the first and second cloths have outer periphery joined to each other, wherein the first and second cloths cooperate to define an airbag compartment;

a third cloth interposed between the first and second cloths, wherein the third cloth covers the gas introduction portion on the side of the object;

a junction which joins the first and third cloths together;

a passage defined between the first and third cloths for communication between the gas introduction portion and the outer periphery of the first cloth;

an exhaust hole arranged in the junction for communication between the third cloth on the object side and the first cloth on the counter-object side; and a connecting member having one end connected to at least one of the first and third cloths and another end connected to the second cloth, wherein the airbag is prepared by a process comprising:
superimposing the first and second cloths on the third cloth;
folding the connecting member; and
superimposing the folded connecting member on the exhaust hole, wherein the folded connecting member conceals at least part of the exhaust hole.

* * * * *